(12) United States Patent
Tucholski (10) Patent No.: US 7,103,622 B1
(45) Date of Patent: Sep. 5, 2006

(54) DIRECT DIGITAL SYNTHESIZER WITH OUTPUT SIGNAL JITTER REDUCTION

(75) Inventor: Hans Tucholski, Co. Limerick (IE)

(73) Assignee: Analog Devices, Inc., Norwood, MA (US)

( * ) Notice: Subject to any disclaimer, the term of this patent is extended or adjusted under 35 U.S.C. 154(b) by 679 days.

(21) Appl. No.: 10/266,410

(22) Filed: Oct. 8, 2002

(51) Int. Cl.
*G06F 1/02* (2006.01)

(52) U.S. Cl. .................. 708/276; 708/101; 708/250; 708/103; 708/8; 708/271; 327/106; 327/105; 327/161; 327/107; 375/362; 375/376

(58) Field of Classification Search ........... 375/362; 708/276, 101, 271; 341/144; 327/105
See application file for complete search history.

(56) References Cited

U.S. PATENT DOCUMENTS

| | | | | |
|---|---|---|---|---|
| 4,410,954 A | * | 10/1983 | Wheatley, III | 708/101 |
| 4,933,890 A | * | 6/1990 | Nuytkens et al. | 708/276 |
| 5,012,437 A | * | 4/1991 | Recker et al. | 708/101 |
| 5,014,231 A | * | 5/1991 | Reinhardt et al. | 708/271 |
| 5,179,348 A | * | 1/1993 | Thompson | 327/105 |
| 6,281,823 B1 | * | 8/2001 | Gross et al. | 341/144 |
| 6,904,112 B1 | * | 6/2005 | Sattler et al. | 375/362 |

* cited by examiner

*Primary Examiner*—Emmanuel Bayard
*Assistant Examiner*—Sudhanshu C. Pathak
(74) *Attorney, Agent, or Firm*—Wolf, Greenfield & Sacks P.C.

(57) ABSTRACT

A method and apparatus for reducing unwanted harmonics in direct digital synthesizer (DDS) output. The method comprises the steps of providing a set of k phase-shifted clock signals, examining, in succession, each DDS accumulator state, and determining whether the DDS accumulator state has a defined transition-state. For each DDS accumulator state having a defined transition-state, an interpolation is performed based upon the value of the preceding DDS accumulator state, an element of the set of phase-shifted clock signals is selected based upon the interpolation, and the most significant bit (MSB) is repositioned using the selected element of the phase-shifted clock signals. The apparatus comprises means for providing a set of k phase-shifted clock signals, means for examining, in succession, each DDS accumulator state, and means for determining whether the DDS accumulator state has a defined transition-state. The apparatus further includes means for performing an interpolation, for each DDS accumulator state having a defined transition-state, based upon the value of the preceding DDS accumulator state, means for selecting an element of the set of phase-shifted clock signals based upon the interpolation, and means for repositioning the MSB using the selected element of the phase-shifted clock signals.

15 Claims, 8 Drawing Sheets

DIRECT DIGITAL SYNTHESIZER WITH OUTPUT SIGNAL JITTER REDUCTION

FIELD OF THE INVENTION

This invention relates generally to direct digital frequency synthesis and in particular to a direct digital synthesizer with reduced output signal jitter, and is more particularly directed toward a direct digital synthesizer that utilizes a hardware interpolation technique to reposition leading and trailing edges of a synthesized output signal.

BACKGROUND OF THE INVENTION

A Direct Digital Synthesiser (DDS) typically consists of an n-Bit adder and a clocked register. This arrangement, forming a numerically controlled oscillator or NCO, produces, at time intervals determined by an input clock, a digital number sequence with a periodicity determined by a digital input data signal. The MSB of the digital output represents a digitally controlled synthesized output clock signal.

Figure 1:
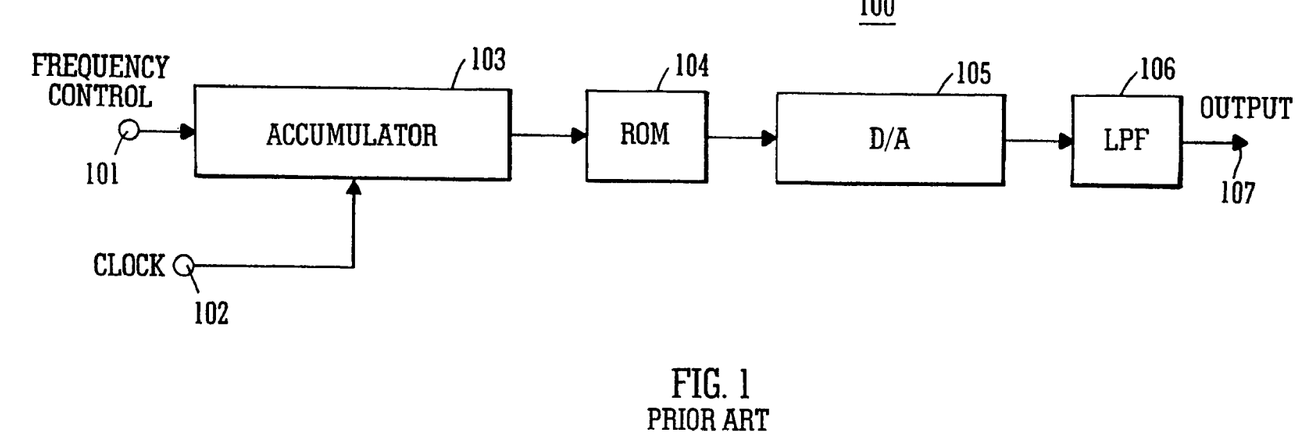
FIG. 1 depicts a direct digital synthesizer of the prior art using ROM look-up and analog smoothing techniques.

Advantages of Direct digital synthesizers such as the DDS 100 depicted in FIG. 1 is that they do not use a variable oscillator. Consequently, a DDS has a very fast lock time and very small frequency steps can be selected.

The DDS is essentially a register or accumulator 103 to which a predetermined frequency control value 101 is added on every cycle of an input clock 102. The digital value from the accumulator 103 is often applied to a read-only memory (ROM) 104 that contains sinusoidal output values. The values from the ROM 104 are applied to a digital-to-analog converter 105 and filtered through a low-pass filter 106 to provide an output signal 107 with reduced spurious components. This method requires considerable additional power and its effectiveness is limited to output clock frequencies as determined by the filter characteristics.

Figure 2:
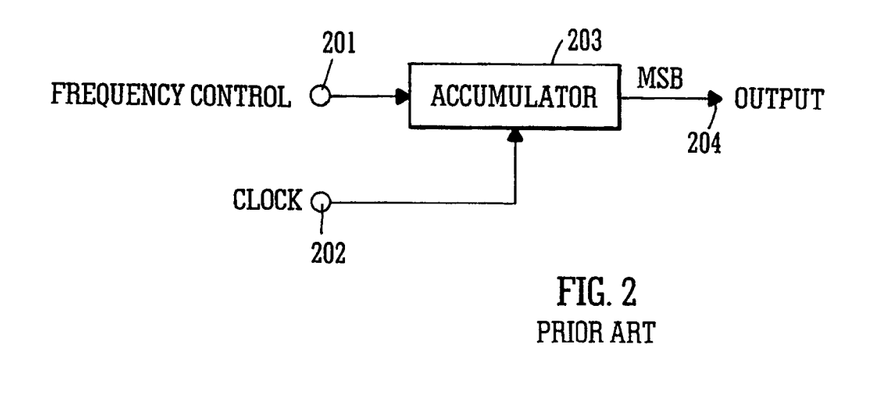
FIG. 2 shows a simple direct digital synthesizer known in the art.

A DDS can be reduced to its simplest terms as shown in FIG. 2. The DDS 200 is merely an accumulator 203 to which a frequency control value 201 is added under control of a clock signal 202. The most significant bit (MSB) of the accumulator 203 provides a digital wave output signal 204. Even if one excludes harmonics, however, the DDS 200 will have a high level of spurious signals for many of the possible values of the frequency control word 201, because the output signal instantaneous frequency will change periodically.

As outlined, there are inherent deviations from the ideal that may limit the application of a DDS. The MSB of the DDS output signal is not a spectrally pure signal, because its frequency and "mark-space" ratio are modulated due to discrete sampling by the input clock. This produces timing jitter with maximally 1 clock period duration and a distribution determined by the digital input signal. For a given required output clock frequency, the timing jitter is proportional to the input clock duration, and hence can be optimized by operating the DDS at a high input clock frequency.

This approach requires the NCO to function at a very high speed, and therefore demands complicated adder architectures, adding significantly to power consumption.

Other known methods employ the generation of analog waveforms at predetermined values of the NCO number sequence, and via a comparator generating a digital output signal which is not synchronous with the input reference clock signal. Such an improvement is achieved through the analog compensation technique illustrated in FIG. 3. Here, the DDS 300 includes a D-to-A converter 304 at the accumulator output, and the analog voltage at the D/A output is applied to a differential amplifier. A delayed version of the D/A output signal is applied to the other input of the differential amp 305. The differential amplifier 305 provides a square wave pulse train to the integrator 307, which converts the square wave into a sawtooth wave.

Figure 3:
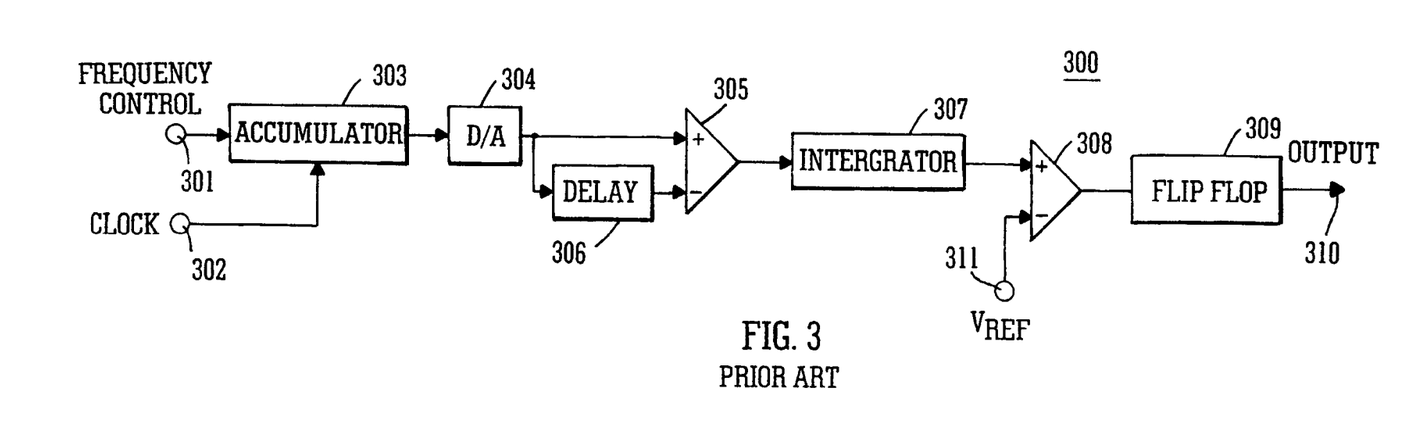
FIG. 3 is a block diagram representation of a direct digital synthesizer of the prior art using analog jitter reduction techniques.

The sawtooth waveform is applied to a comparator 308 with a reference voltage 311 at one input. The reference voltage 311 is chosen to be half of the voltage represented by a maximum output from the accumulator 303. The square wave output of the comparator 308 is still asymmetric, but the leading edges occur at intervals with less jitter. If this square wave signal is then applied to a toggle flip-flop 309, the jitter of the output signal 310 will be reduced, and will contain a reduced number of unwanted signals with the exception of the odd harmonics. The notable disadvantage of the DDS 300 of FIG. 3 is that it uses analog techniques to reduce spurious output signals, and similarly to the previous case, this approach requires additional power and its effectiveness depends significantly on maintaining the precision of the analog waveforms for variable input and output.

The advantages of the analog means to reduce the jitter as opposed to techniques that involve the increase of the clocking frequency has resulted in many prior art devices employing predominantly analog means to reduce output signal timing jitter. Unfortunately the usage of an analog solution to the jitter problem suffers from traditional analog problems in that it is more difficult to implement, is non-predictable in its output and is a heavy power consumer. Accordingly, a need arises for a DDS that accomplishes jitter reduction entirely by digital means, and thus avoids parametric variations that plague analog solutions. Such a need has been acknowledged by Goldberg in Chapter four of DDS General Architecture in his book entitled "Digital Frequency Synthesis demystified", published by LLH Technology Publishing wherein he suggests one solution based on using the carry output bit as an output, and delaying the carry signal so as to effect a more regular interval between transitions. Although this does provide an all digital solution it suffers because it is implemented on the carry signal. The solution described by Goldberg is restricted to the narrow pulse of the carry signal thereby leading to significant unwanted signal components. A reduction of these requires a division of the carry signal frequency by at least a factor of 2, thus reducing the output frequency range. There remains therefore a need for an all digital DDS adapted to achieve reduction of timing jitter over a wide range of input and output clock frequencies using digital data processing without incurring significant increases in complexity and power consumption.

SUMMARY OF THE INVENTION

These shortcomings of the prior art, and others, are addressed by the direct digital synthesizer of the present invention. The present invention contemplates a DDS consisting generally of an n-bit digital adder and an n-bit register which is clocked by a frequency reference signal. The adder receives a digital input word and the register output word. The overflow condition of the adder is signalled by a carry bit, which is also sampled in a register by the frequency reference signal.

The register outputs of the carry bit and the most significant bit (MSB) directly represent the periodicity of the digitally synthesized signal. The average frequency of these signals is precisely the clock frequency multiplied by the fraction resulting from dividing the numerical value of the digital input word by the range of the digital adder, $2^n$.

The present invention provides a DDS architecture achieving a reduction of the timing jitter of a synthesized output signal using digital data processing, without incurring significant increases in complexity and power requirements. The present invention achieves this jitter reduction for a wide range of frequencies of the frequency reference signal and the synthesized output signal without requiring a frequency division of the output signal A method and apparatus are provided for performing interpolation of an NCO digital output signal during predetermined frequency reference signal intervals causing state transitions of an output signal to occur at variable discrete times during predetermined frequency reference signal time intervals. This technique, combined with a novel interpolation technique, enables an implementation requiring significantly less power consumption and silicon area compared to prior art solutions.

In the present invention, a DSP need only perform summation calculations and evaluate the summation results to determine an error correcting delay for application to a 1-bit DDS output. The summation calculation may be performed in an incremental manner, or more efficiently in the manner of a successive approximation process. This results in a significant saving of digital adders and registers. This is in contrast to DSP implementations of the prior art that require a division calculation to be performed. The effect of the interpolation process on the 1-bit output signal is equivalent to the effect obtained from operating a conventional DDS at significantly greater input clock frequencies.

In accordance with one aspect of the invention, a method for reducing unwanted harmonics in direct digital synthesizer output is provided. The method comprises the steps of providing a set of phase-shifted clock signals, examining, in succession, each DDS accumulator state, and determining whether the DDS accumulator state has a defined transition-state. For each DDS accumulator state having a defined transition-state, an interpolation is performed based upon the value of the preceding DDS accumulator state, an element of the set of phase-shifted clock signals is selected based upon the interpolation, and the MSB is repositioned using the selected element of the phase-shifted clock signals.

In one embodiment of the invention, the step of providing a set of k phase-shifted clock signals further comprises the steps of providing a master clock signal having a period T, dividing the master clock signal period into k equal intervals T/k, and producing a set of k phase-shifted clock signals, each of which is shifted T/k with respect to the other elements of the set of phase-shifted clock signals. The integer k is preferably an integral power of 2.

According to one aspect of the invention, the step of examining, in succession, each DDS accumulator state comprises assigning an amplitude to each accumulator state based upon the binary value of the accumulator. Further, the step of determining whether the DDS accumulator state has a defined transition-state further comprises the steps of selecting a reference level limit (LMT), and determining the values of the current and preceding DDS accumulator states relative to LMT. A positive transition-state is assigned to the current DDS accumulator state if the value of the current DDS accumulator state is greater than or equal to LMT and the value of the preceding DDS accumulator state is less than LMT and in circumstances wherein the value of the current DDS accumulator state is less than LMT, then a negative transition-state is assigned to the current DDS accumulator state if the value of the preceding DDS accumulator state is greater than or equal to LMT.

The step of selecting a reference level LMT preferably comprises selecting LMT equal to the modulus of the DDS accumulator divided by 2.

In yet another aspect of the invention, the DDS accumulator has a frequency control value/word (FCW), and the step of performing an interpolation further comprises the steps of (for a DDS accumulator state having a defined positive transition-state) computing a difference in value between half the modulus of the DDS accumulator and the preceding DDS accumulator state to provide an accumulator differential value, determining a quotient of the accumulator differential value and the frequency control value FCW to provide a clock shift ratio, and multiplying the clock shift ratio by k to provide a clock shift multiplier.

For a DDS accumulator state having a defined negative transition-state, a difference in value between the modulus of the DDS accumulator and the preceding DDS accumulator state is computed to provide an accumulator differential value, a quotient of the accumulator differential value and the frequency control value FCW is determined to provide a clock shift ratio, and the clock shift ratio is multiplied by k to provide a clock shift multiplier.

In accordance with yet another aspect of the invention, the step of selecting an element of the set of phase-shifted clock signals comprises selecting the element of the set of phase-shifted clock signals identified by the clock shift multiplier to provide a selected phase-shift clock. The step of repositioning the MSB further comprises the steps of (for a DDS accumulator state having a defined positive transition-state) advancing the leading edge of the MSB to a point corresponding to the leading edge of the selected phase-shift clock. For a DDS accumulator state having a defined negative transition-state, the trailing edge of the MSB is advanced to a point corresponding to the leading edge of the selected phase-shift clock.

In accordance with another embodiment of the invention, apparatus is provided for reducing unwanted harmonics in direct digital synthesizer output. The apparatus comprises means for providing a set of k phase-shifted clock signals, means for examining, in succession, each DDS accumulator state, and means for determining whether the DDS accumulator state has a defined transition-state. The apparatus further includes means for performing an interpolation, for each DDS accumulator state having a defined transition-state, based upon the value of the preceding DDS accumulator state, means for selecting an element of the set of phase-shifted clock signals based upon the interpolation, and means for repositioning the MSB using the selected element of the phase-shifted clock signals.

In still another aspect of the invention, the means for providing a set of k phase-shifted clock signals further comprises means for providing a master clock signal having a period T, means for dividing the master clock signal period into k equal intervals T/k, and means for producing a set of k phase-shifted clock signals, each of which is shifted T/k with respect to the other elements of the set of phase-shifted clock signals. The integer k is preferably an integral power of 2, typically equal to 8 or 16, although it will be appreciated that any suitable value may be found for specific applications, and the higher the value of k utilised the closer the approximation to an ideal situation is found.

According to yet a further aspect of the invention, the means for examining, in succession, each DDS accumulator state comprises means for assigning an amplitude to each accumulator state based upon the binary value of the accumulator. Further, the means for determining whether the DDS accumulator state has a defined transition-state further comprises means for selecting a reference level LMT, means for determining whether the value of the current DDS accumulator state is greater than or equal to LMT, means for assigning a positive transition-state to the current DDS accumulator state if the value of the preceding DDS accumulator state is less than LMT, means for determining whether the value of the current DDS accumulator state is less than LMT, and means for assigning a negative transition-state to the current DDS accumulator state if the value of the preceding DDS accumulator state is greater than or equal to LMT.

The means for selecting a reference level LMT preferably comprises means for selecting LMT equal to the modulus of the DDS accumulator divided by 2.

In yet another aspect of the present invention, the DDS accumulator has a frequency control value FCW, and the means for performing an interpolation further comprises (for a DDS accumulator state having a defined positive transition-state) means for computing a difference in value between half the modulus of the DDS accumulator and the preceding DDS accumulator state to provide an accumulator differential value, means for determining a quotient of the accumulator differential value and the frequency control value FCW to provide a clock shift ratio, and means for multiplying the clock shift ratio by k to provide a clock shift multiplier.

For a DDS accumulator state having a defined negative transition-state, the apparatus comprises means for computing a difference in value between the modulus of the DDS accumulator and the preceding DDS accumulator state to provide an accumulator differential value, means for determining a quotient of the accumulator differential value and the frequency control value FCW to provide a clock shift ratio, and means for multiplying the clock shift ratio by k to provide a clock shift multiplier.

In accordance with yet another aspect of the invention, the means for selecting an element of the set of phase-shifted clock signals comprises means for selecting the element of the set of phase-shifted clock signals identified by the clock shift multiplier to provide a selected phase-shift clock.

The means for repositioning the MSB further comprises (for a DDS accumulator state having a defined positive transition-state) means for advancing the leading edge of the MSB to a point corresponding to the leading edge of the selected phase-shift clock. For a DDS accumulator state having a defined negative transition-state, means are provided for advancing the trailing edge of the MSB to a point corresponding to the leading edge of the selected phase-shift clock.

Further objects, features, and advantages of the present invention will become apparent from the following description and drawings.

DETAILED DESCRIPTION OF THE INVENTION

FIGS. 1 to 3 have been hereinbefore described with reference to the prior art implementations in the field of direct digital synthesisers. In accordance with the present invention, a direct digital synthesizer having reduced output signal jitter is described that provides distinct advantages when compared to those of the prior art.

Figure 4:
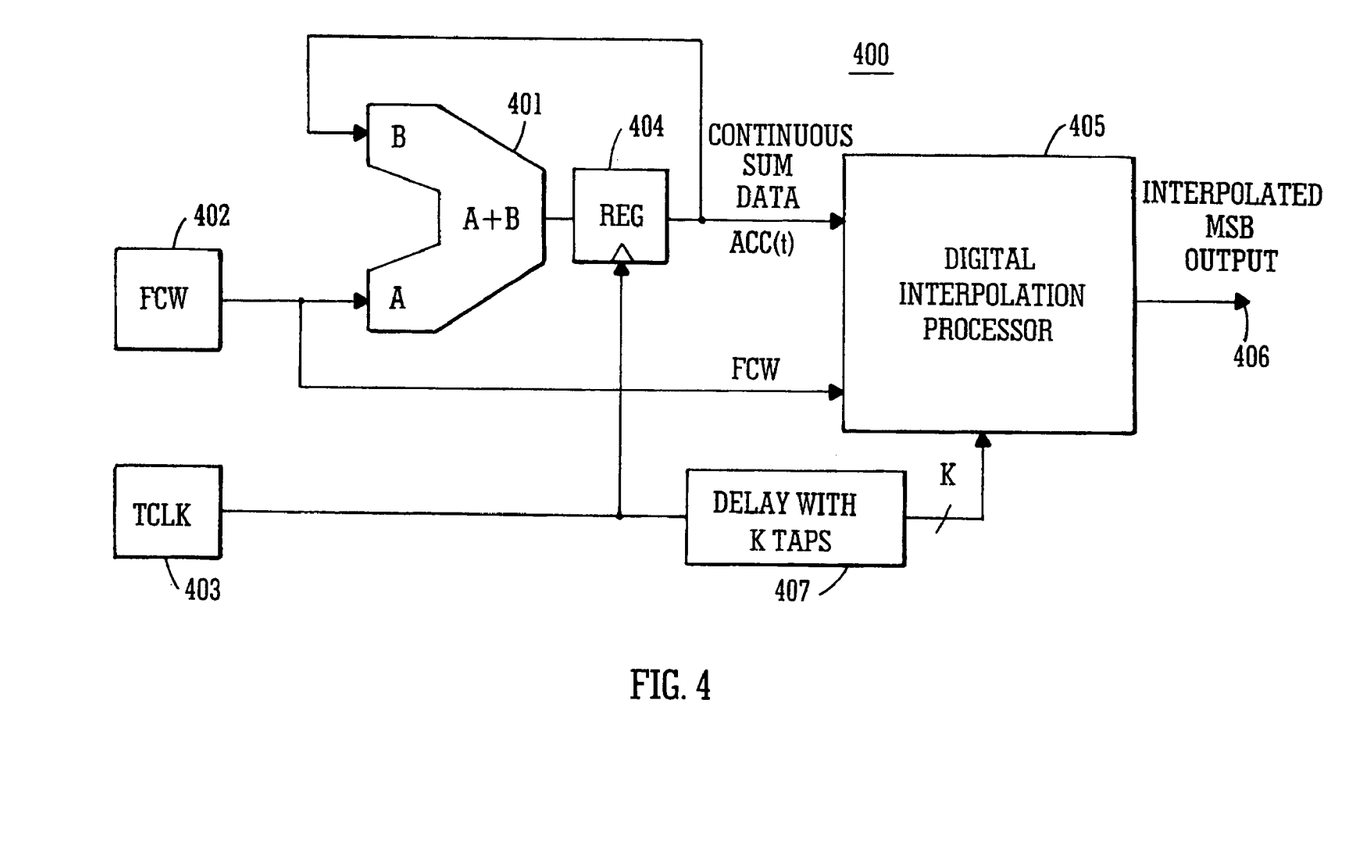
FIG. 4 is a block diagram of an all digital DDS in accordance with the present invention.

FIG. 4 is a block diagram of a DDS 400 with reduced jitter that uses strictly digital processing to accomplish the task, in accordance with the present invention. A clocked logic unit 401 serves as the accumulator in which a frequency control word FCW 402 is added to the accumulator value every clock cycle, with the clock signal provided by master clock generator TCLK 403. A clocked register Reg 404 at the output of the logic unit 401 serves to present the continuous sum data Acc(t) to a digital interpolation processor block 405. The digital interpolation processor block 405 also receives the increment data FCW 402 and k delayed versions of TCLK 407 as inputs. At the output 406 of the digital interpolation processor 405 is an interpolated MSB with reduced jitter.

For ease of understanding the present invention will now be described with reference to an exemplary mode of operation, where the accumulator associated with the block diagram of FIG. 4 is a four bit register, and a frequency increment value of 5 (0101 binary) is added to the register every clock cycle.

Since the addition to the accumulator must be modulo 16, the values that the accumulator may assume are listed below:

| Clock Cycle | Accumulator (binary) | MSB |
| --- | --- | --- |
| 0 | 0000 | 0 |
| 1 | 0101 | 0 |
| 2 | 1010 | 1 |
| 3 | 1111 | 1 |
| 4 | 0100 | 0 |
| 5 | 1001 | 1 |
| 6 | 1110 | 1 |
| 7 | 0011 | 0 |
| 8 | 1000 | 1 |
| 9 | 1101 | 1 |
| 10 | 0010 | 0 |
| 11 | 0111 | 0 |
| 12 | 1100 | 1 |
| 13 | 0001 | 0 |
| 14 | 0110 | 0 |
| 15 | 1011 | 1 |
| 16 | 0000 | 0 |

It should be noted from this list that the MSB sequence does not have a constant period. As mentioned previously, the period varies irregularly. This is due to the relationship between the increment value and the register width or accumulator range.

Figure 6:
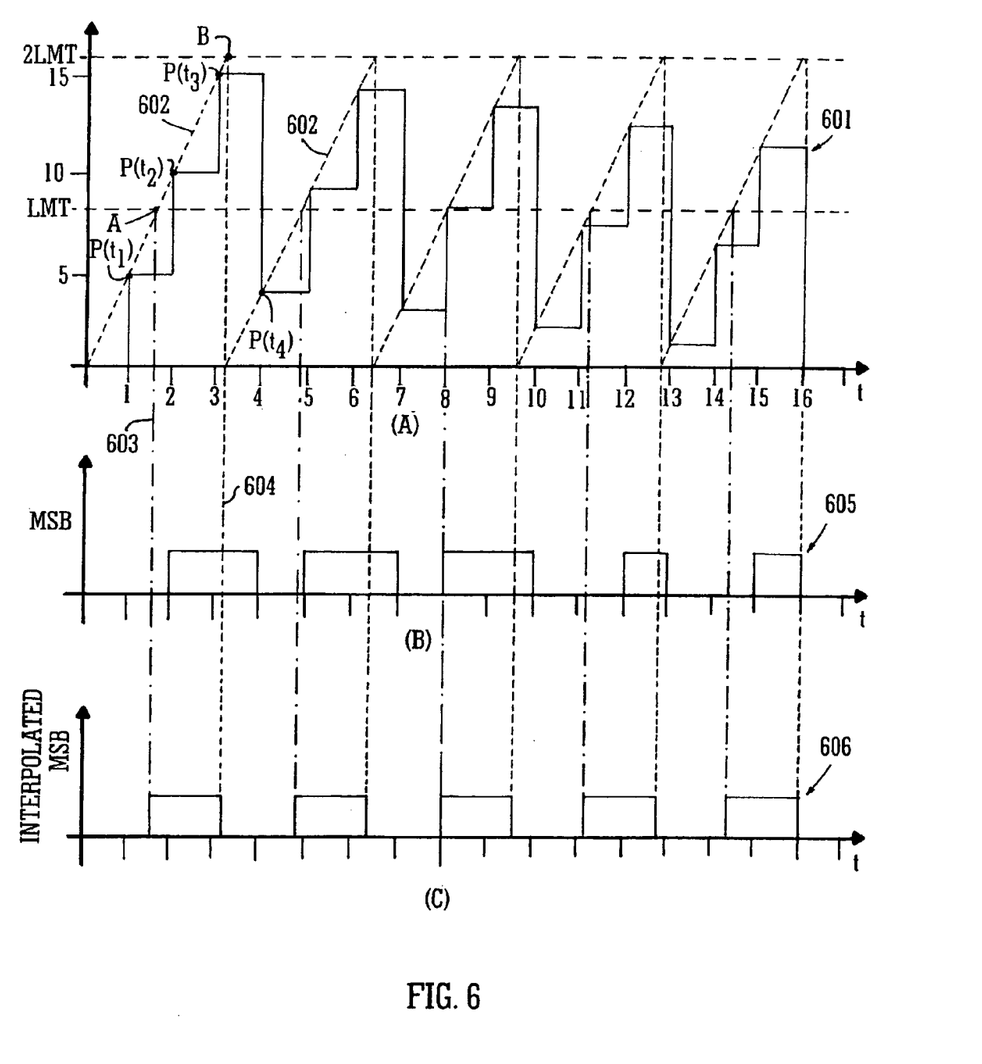
FIG. 6 is a composite timing diagram that illustrates jitter reduction in accordance with the present invention.

The MSB sequence tabulated above is illustrated in FIG. 6b (605). As can be appreciated from an examination of the timing diagram, the irregular nature of the MSB stream will give rise to a host of spurious spectra that will adversely affect the operation of a system in which the DDS is installed.

For the correct operation of a DDS, with a frequency control increment set to 5, five complete cycles of the output waveform are required to occur during sixteen cycles of the master clock, TCLK. This is in accordance with the defining equation for a direct digital synthesizer, in which the output frequency is determined by dividing the frequency control increment by the range of the accumulator, and multiplying by the master clock frequency. Examination of the timing diagram 605 of FIG. 6b shows that the uncorrected MSB does, in fact, assert itself five times during the sixteen clock cycles displayed in the figure.

However as stated above the MSB pulses are irregular, in both pulse duration and pulse repetition rate. In the simple example given above, ideally the MSB period should be 3.2 clock units. This number is arrived at by a simple division of the modulus ($2^m$ where m=4) by the frequency increment value (5 in the example).

While this is the average MSB period for the pulse train shown in FIG. 6b (605), it will be appreciated that there is considerable unwanted variation, as noted above.

The method that the present invention employs to correct the irregularity of the output period of the DDS may be understood with reference to the timing diagram of FIG. 6a.

FIG. 6a illustrates the stairstep pulse train 601 produced by plotting the magnitude of Acc(t) (the accumulator contents) after each clock pulse in the system of the example, in which the accumulator is four bits wide and the frequency control increment is 5. The master clock frequency TCLK of the DDS is the clock that controls addition of the frequency control increment to the accumulator. In other words, one addition occurs each master clock cycle.

In FIG. 6a the stairstep waveform 601 is shown in conjunction with an ideal periodic sawtooth waveshape illustrated by construction lines 602. These construction lines 602 follow the slope of the accumulator contents and are extended between zero and the full range of the accumulator, 2*LMT. The sawtooth waveform revealed by the construction lines 602 occurs precisely five times within sixteen master clock cycles ie it has the same frequency as that required at the DDS output. Ideally, in order to produce a periodic output, one would wish the DDS output waveform to rise to a logic high at the point A where the sawtooth wave amplitude crosses LMT, and to fall to zero at the point when the sawtooth wave amplitude is 2*LMT. As will be appreciated, the reference point LMT occurs at precisely the mid-point of the ideal sawtooth waveform.

The present invention uses LMT as the switching threshold to correct the MSB output signal. This gives rise to a 50% duty cycle output signal, which is what is desired. The corrected, or interpolated, MSB is shown in the timing diagram 606 of FIG. 6c.

The invention generates k different shifted in phase versions of the master clock, TCLK. The most appropriate phase shifted clock can then be used to reposition the MSB output waveform to achieve the required periodic waveform.

Figure 9A:
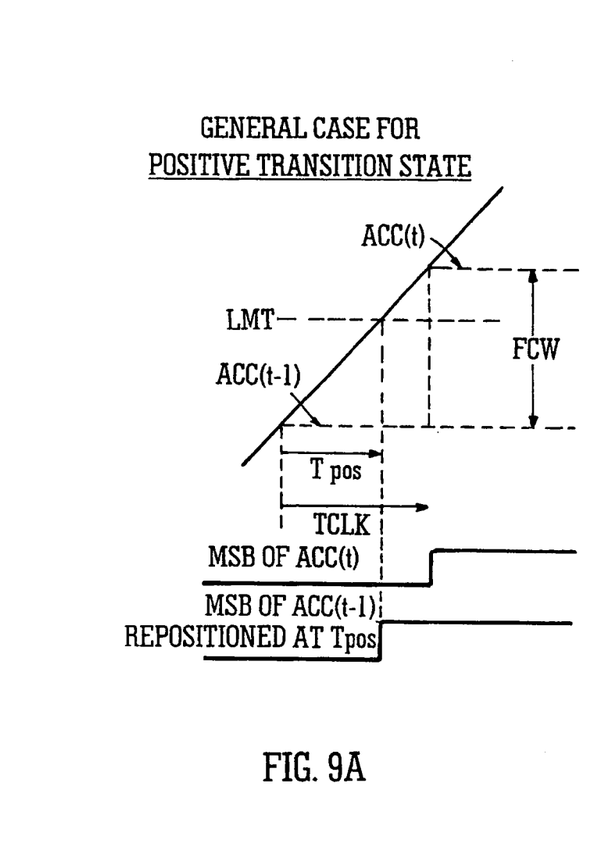
FIGS. 9*a* and 9*b* shows graphs used to derive the positive and negative transition-state interpolation algorithms according to the present invention.

The interpolation algorithm is based upon the rule of similar triangles. Referring to a graph of a portion of the stairstep waveform 601 shown in conjunction with the sawtooth waveshape as shown in FIG. 9a, it will be appreciated that $$\frac{FCW}{TCLK} = \frac{LMT - ACC(t-1)}{Tpos} \quad (1)$$

where ACC (t−1) is the accumulated value of the previous clock cycle, Tpos is the ideal position for the DDS output to rise to a logic high, k is the number of shifted clocks provided and kpos is the number of the selected shifted clock to be used to reposition the rising edge of the MSB.

It can also be shown that $$Tpos = \frac{TCLK}{k} * kpos \quad (2)$$

Substituting equation (2) into equation (1) we get $$\frac{kpos}{k} * FCW + ACC(t-1) = LMT$$

It will be appreciated that kpos is a a binary number. Therefore, representing k in binary form, the equation becomes $$\left[ B(n-1) * \frac{FCW}{2} + B(n-2) * \frac{FCW}{4} + \ldots + B(0) * \frac{FCW}{2^n} \right] + ACC(t-1) = LMT$$

where n is the number of bits representing k−1.

This is the positive transition-state interpolational algorithm. It is the algorithm that the present invention implements for positive transition-state interpolation. On detection of a positive transition-state, this algorithm is invoked to calculate the values for bits B(n−1) to B(0) of kpos. Once a value for kpos has been calculated, it is then possible to compute Tpos. This is the position where the output waveform should be set in order to provide a 50% duty cycle as required for an ideal DDS.

Figure 9B:
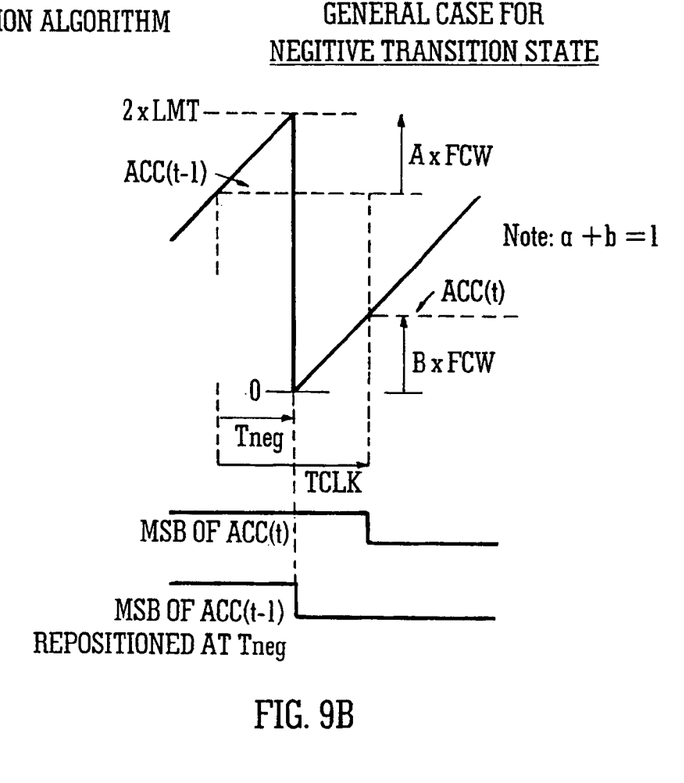

Similarly, by examining the graph of FIG. 9b it can be shown that $$\frac{FCW}{TCLK} = \frac{2*LMT - ACC(t-1)}{Tneg} \quad \text{and} \quad (3)$$

$$Tneg = \frac{TCLK}{k} * kneg \quad (4)$$

where Tneg is the ideal position for the DDS output to fall to a logic low and kneg is the number of the selected shifted clock to be used to reposition the falling edge of the MSB.

Similarly, from substitution of equation (4) into equation (3) the following algorithm can be derived:

$$\left[ B(n-1) * \frac{FCW}{2} + B(n-2) * \frac{FCW}{4} + \ldots + B(0) * \frac{FCW}{2^n} \right] + ACC(t-1) =$$

-continued $$2 * LMT$$

This is the negative transition-state interpolation algorithm. It is the algorithm that the present invention implements for negative transition-state interpolation. On detection of a negative transition-state, this algorithm is invoked to calculate the values for bits B(n−1) to B(0) of kneg. Once a value for kneg has been calculated, it is then possible to compute Tneg. This is the position where the output waveform should be reset in order to provide a 50% duty cycle as required for an ideal DDS.

As previously stated, in order to apply the results of these algorithms, the system generates k different phase shifted versions of the master clock, TCLK. The system then uses the calculated values of kpos and kneg to select the appropriate phases of the k shifted clocks that will be used to advance the leading and trailing edges of the MSB so as to provide a 50% duty cycle clock.

It will be appreciated that in the exemplary illustration hereinbefore described that there are a finite number delay clocks available. The computational element of the preferred embodiment selects the closest of the k available clock phases. However it will be appreciated that the more k clock phases provided, the greater the reduction in jitter.

It will be appreciated that the positive and negative transition-state algorithms require that a reference value LMT be derived. In the exemplary form of the invention hereinbefore described, LMT is $2^m/2$, or 8. It will be understood that the LMT value is calculated as a function of the modulus, specifically the modulus/2. The upper limit value, represented in FIG. 7 as (2*LMT), is simply the modulus of the accumulator. Of course, the value of the accumulator can never reach the modulus, since 16 expressed in four binary bits is zero, but 2*LMT is a necessary reference point for the interpolation process.

Figure 7:
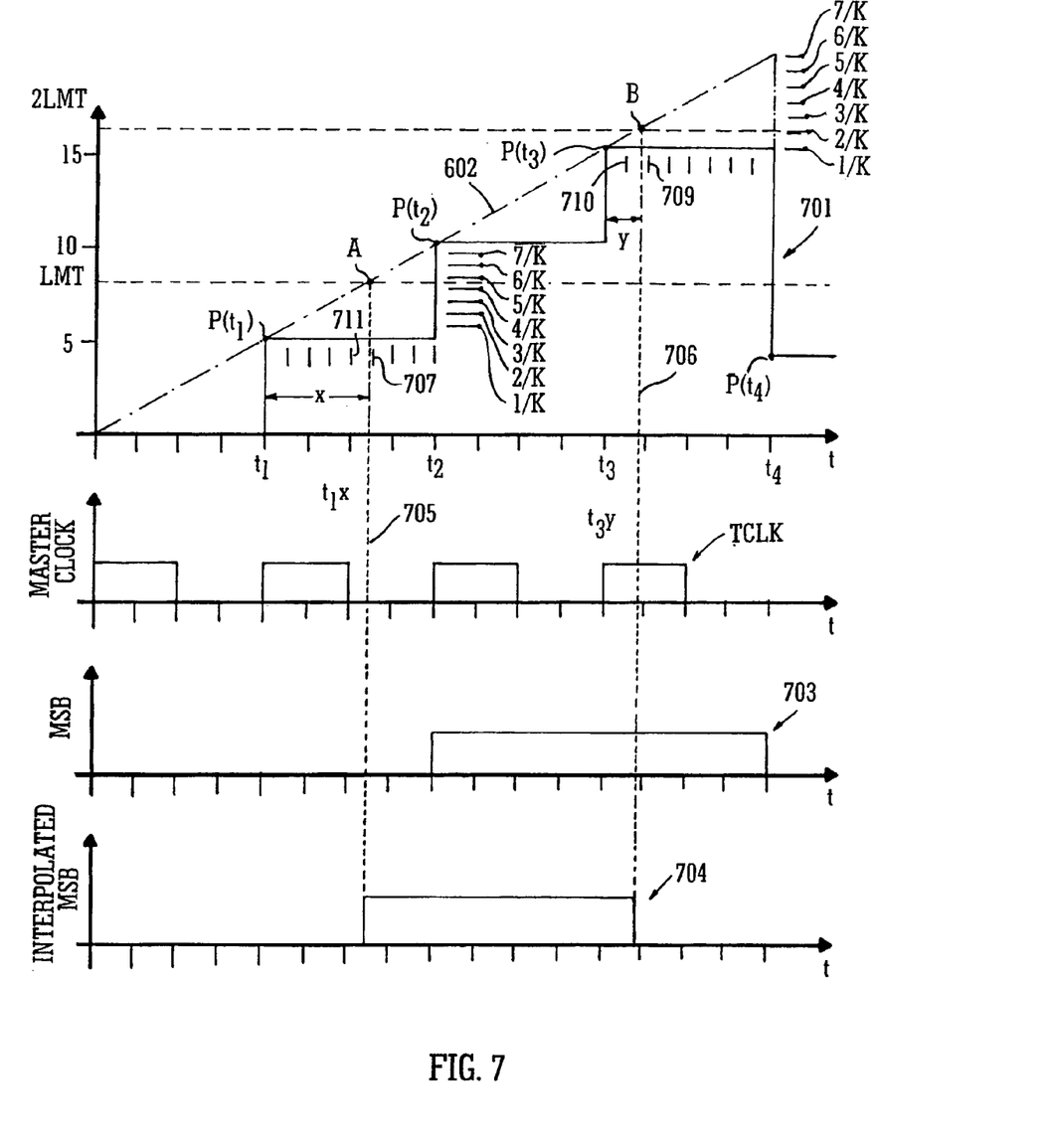
FIG. 7 is a detailed view of a portion of the timing diagram of FIG. 6, with some additional timing information added.

As previously stated, the positive transition-state interpolation algorithm is invoked when a positive transition-state is detected. This is carried out through the digital interpolation processor 405, by examining each discrete point represented by the successive states of the accumulator. A point on the stairstep waveform is considered to have positive transition-state if Acc(t)≧LMT and Acc(t−1)<LMT. In the graph of FIG. 7, the first point on waveform 701 (FIG. 7) to have positive transition-state is $P(t_2)$.

Similarly, the negative transition-state interpolation algorithm is invoked when a negative transition-state is detected by the digital interpolation processor 405. A negative transition-state occurs where the current accumulator value Acc(t)<LMT while the immediately preceding value Acc(t−1)≧LMT. In the graph of FIG. 7, the negative transition-state criterion is satisfied by $P(t_4)$.

Figure 5:
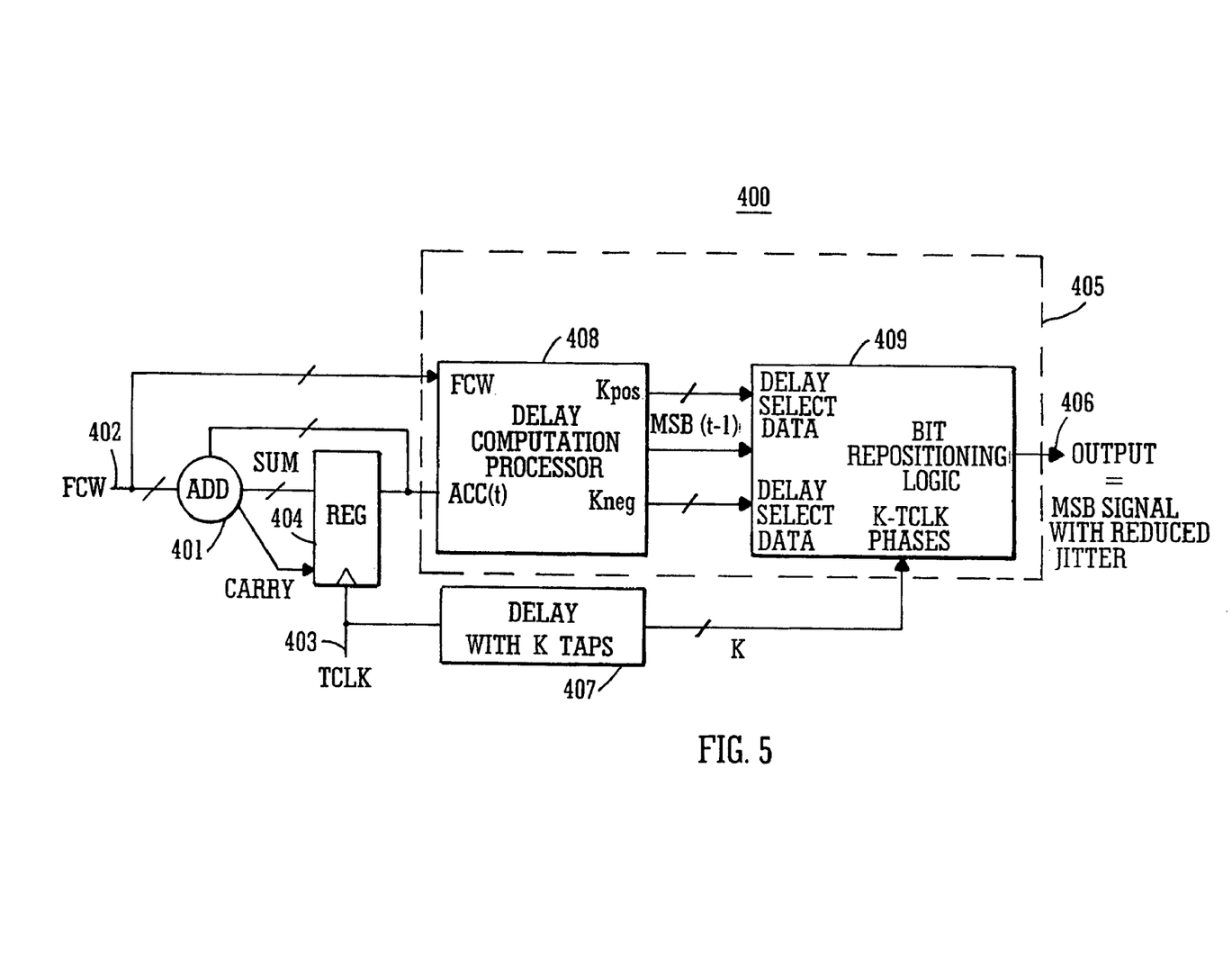
FIG. 5 illustrates, in block diagram form, the components of a digital interpolation processor in accordance with the present invention.

Turning to FIG. 5, a more detailed block diagram is presented that illustrates the components of the present invention.

It includes a delay computation processor block 408, a bit repositioning logic block 409 and a clock delay block 407.

The delay computation processor block 408 examines the output of the continuous sum data ACC(t). The output is examined by positive transition-state detector logic for positive transition-state detection, and by negative transition-state detector logic for negative transition-state detection. On detection of a positive or negative transition-state, the values for kpos and kneg are calculated by using the algorithms previously described. These values for kpos and kneg are the control values for selection of the most appropriate of the k phase shifted clocks for repositioning of the MSB, so as to produce an output signal with a 50% duty cycle as required. The calculated values for kpos and kneg are then passed to the bit repositioning logic block 409 to perform the interpolation to adjust the leading edge and trailing edge of the MSB pulse 703 to correspond to the leading edges of the selected k shifted clocks.

A delay block 407, takes as input the master clock TCLK and outputs a set of k clocks, each of which is shifted from the previous clock by 1/k of a clock period. These k delayed versions of TCLK are then passed as inputs to the bit respositioning logic block 409. The MSB of the continuous sum data is also received as an input to the bit positioning logic block 409.

At the bit repositioning logic block 409 the most appropriate phase shifted clocks are selected from the k phase shifted clock line inputs to the block to set and reset the MSB output so as to produce a constant periodic output DDS waveform. The MSB is then repositioned with respect to the selected clock phases, to produce an interpolated MSB with reduced jitter.

Figure 8:
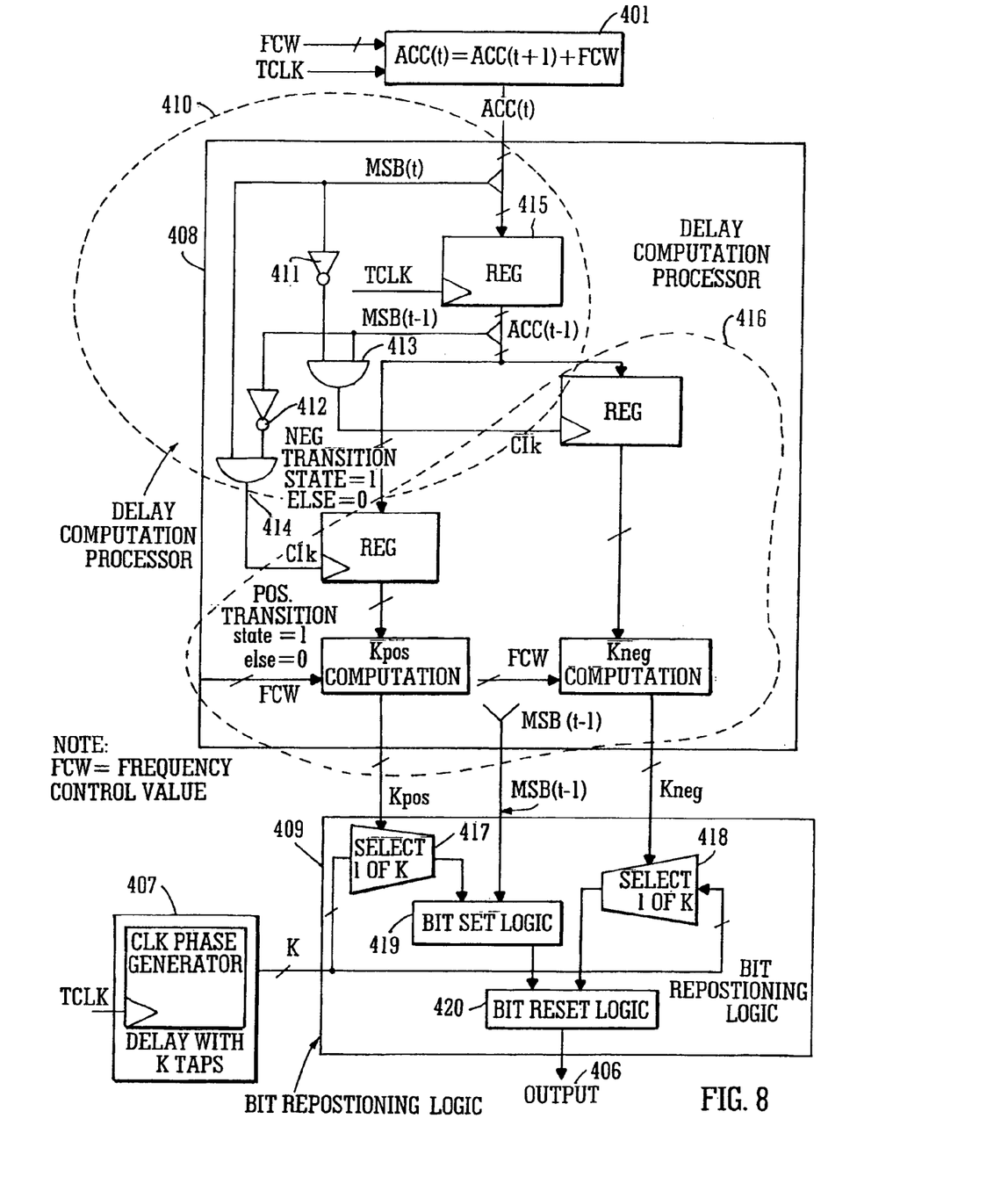
FIG. 8 is a more detailed block diagram of an all digital DDS in accordance with the present invention.

FIG. 8 shows a more detailed view of the delay computation processor block 408 and the bit repositioning logic block 409.

The exemplary hardware logic implementation for detecting the positive and negative transition-state at the accumulator output is shown within the broken line 410. It comprises two logic invertors 411 and 412, two AND logic gates 413 and 414 and a register 415. It will be appreciated by those skilled in the art that the output of the AND gate 414 will only go high when a positive transition-state is detected at the accumulator output. Similarly, the output of AND gate 413 will only go high when a negative transition-state is detected at the accumulator output. The detection of either a positive or negative transition-state, acts as a clock signal for the registers located within the broken line 416, where the values for Kpos or Kneg are computed. These values may be computed for example by using a successive approximation algorithm, or other such means.

On computation of the values for kpos and kneg, their values are passed to the bit repositioning logic block 409. Here the values for kpos and kneg are used as control signals to the multiplexors 417 and 418, for selecting the most appropriate of the k shifted phase clocks for repositioning the MSB. The selected phase shifted clock for repositioning the rising edge of the MSB is then passed to the bit set logic block 419 along with the MSB bit as input. Here the leading edge of the MSB is repositioned to correspond with the leading edge of the selected phase shifted clock. Similarly the selected shifted phase clock for repositioning the falling edge of the MSB is passed to the bit reset logic block 420 along with the MSB. Here the trailing edge of the MSB is repositioned to correspond with the leading edge of the selected phase shifted clock. The translated and altered MSBs then yield an interpolated MSB stream at the device output 406.

The result is evident from an examination of FIG. 7, which superimposes an actual set of values with an idealised solution. Pulse sequence 703 represents the original MSB, while pulse train 704 is the interpolated MSB. The interpolated MSB is now positioned more centrally within the stairstep waveform segment, and its duration is much closer to 1.6 clock pulses, which is the target value. Of course, a quantization error is also evident with respect to the positioning of the trailing edge of the interpolated MSB. An exact solution is shown by the position of construction line 705, 706 which will be understood as being provided by a solution involving an infinite value of phase-shifted clock pulses, k. Using an interpolation in accordance with the invention, where only a limited number of delay clock phases are available, would place the falling edge of the interpolated MSB closer to reference line 710 or closer to reference line 711. It will be appreciated that the technique of the present invention enables an approaching of the idealised solution provided by the lines 705, 706 from values less than the idealised solution, the level of differentiation being determined by the number of phase-shifted clock pulses.

The MSB is continuously processed using this technique and repositioned to minimize irregularities in the periodicity of the MSB stream. In this fashion, the spurs in the DDS output are greatly reduced.

It will be appreciated that the technique described thus far utlises a truncation operation to select the element of the set of phase-shifted clock signals. The use of truncation is advantageous in that it reduces the possibility of frequency errors. It will be apparant to the person skilled in the art that a rounding operation could also be utilised. Such a rounding operation could be provided in either a rounding up or rounding down of the desired value. In a rounding up operation the falling edge of the interpolated MSB will be closer to reference lines 707, 709. It will be apparant that a rounding operation may introduce frequency errors. It is possible to minimize the frequency error in rounding operations by implementing a rounding in a random fashion, and it will be appreciated that the present invention is not to be limited to any one technique to provide for the selection of the element of the set of phase-shifted clock signals, except as may be deemed necessary in the light of the appended claims.

There has been described herein a direct digital synthesizer with reduced output signal jitter which is improved over the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for reducing unwanted harmonics in direct digital synthesizer (DDS) output, the method comprising the acts of:
   (a) providing a set of phase-shifted clock signals;
   (b) examining, in succession, each DDS accumulator state;
   (c) determining whether the DDS accumulator state has a defined transition-state;
   (d) for each DDS accumulator state having a defined transition-state, performing an interpolation based upon the value of the preceding DDS accumulator state;
   (e) selecting an element of the set of phase-shifted clock signals based upon the interpolation;
   (f) repositioning the DDS accumulator most significant bit (MSB) using the selected element of the phase-shifted clock signals and;
   (g) wherein the act of determining whether the DDS accumulator state has a defined transition-state further comprises the acts of:
      (c1) selecting a reference level LMT;
      (c2) determining whether the value of the current DDS accumulator state is grater than or equal to LMT and, if so, assigning a positive transition-state to the current DDS accumulator state if the value of the preceding DDS accumulator state is less than LMT; or
      (c3) determining whether the value of the current DDS accumulator state is less than LMT and, if so, assigning a negative transition-state to the current DDS accumulator state if the value of the preceding DDS accumulator state is greater than or equal to LMT.

2. The method in accordance with claim 1, wherein the number of elements in the set of phase-shifted clock signals is an integral power of 2.

3. The method in accordance with claim 1, wherein the act of examining, in succession, each DDS accumulator state comprises the step of comparing successive DDS accumulator signals.

4. The method in accordance with claim 1, wherein the act of selecting a reference level LMT comprises selecting LMT equal to the modulus of the DDS accumulator divided by 2.

5. The method in accordance with claim 1, wherein the DDS has an accumulator, the DDS accumulator has a frequency control value FCW, and the step of performing an interpolation further comprises the acts of:
   (h) selecting a reference level LMT; and
   (i) for a DDS accumulator state having a defined positive transition-state:
      (1) incrementing the preceding DDS accumulator state by values relating to incremental sums of fractional values of FCW,
      (2) noting the value of the largest incremental sum of fractional values required not to exceed the LMT, this value representing a clock shift ratio,
      (3) using the clock shift ratio to reposition the leading edge of the MSB; or
   for a DDS accumulator state having a defined negative transition-state:
      (4) incrementing the preceding DDS accumulator state by values relating to incremental sums of fractional values of FCW,
      (5) noting the value of the fractional values required not to exceed a 2*LMT−1 value, this value representing a clock shift ratio, and
      (6) using the clock shift ratio to reposition the trailing edge of the MSB.

6. The method in accordance with claim 1 wherein the act of performing an interpolation based upon the value of the preceding DDS accumulator state is effected using a rounding operation.

7. Apparatus for reducing unwanted harmonics in direct digital synthesizer (DDS) output comprising:
   means for providing a set of k phase-shifted clock signals, where k is an integer;
   means for examining, in succession, each DDS accumulator state;
   means for determining whether the DDS accumulator state has a defined transition-state;
   for each DDS accumulator state having a defined transition-state, means for performing an interpolation based upon the value of the preceding DDS accumulator state;
   means for selecting an element of the set of phase-shifted clock signals based upon the interpolation;
   means for repositioning the DDS accumulator most significant bit (MSB) using the selected element of the phase-shifted clock signals; and
   wherein the means for determining whether the DDS accumulator state has a defined transition-state further comprises:

means for selecting a reference level LMT;

means for determining the value of the current DDS accumulator state relative to LMT, means for determining the value of the preceding DDS accumulator state relative to LMT;

means for assigning a positive transition-state to the current DDS accumulator state if the value of the current DDS accumulator state is greater than or equal to LMT and the value of the preceding DDS accumulator state is less than LMT; and means for assigning a negative transition-state to the current DDS accumulator state if the value of the current DDS accumulator state is less than LMT and the value of the preceding DDS accumulator state is greater than or equal to LMT.

8. The apparatus of claim 7, wherein the means for providing a set of k phase-shifted clock signals further comprises:

means for providing a master clock signal having a period T;

means for dividing the master clock signal period into k equal intervals T/k; and means for producing a set of k phase-shifted clock signals, each of which is shifted T/k with respect to the other elements of the set of phase-shifted clock signals.

9. The apparatus of claim 8, wherein the integer k is an integral power of 2.

10. The apparatus of claim 9, wherein the integer k is equal to 8.

11. The apparatus of claim 7, wherein the means for examining, in succession, each DDS accumulator state comprises means for assigning an amplitude to each accumulator state based upon the binary value of the accumulator.

12. The apparatus of claim 7, wherein the means for selecting a reference level LMT comprises means for selecting LMT equal to the modulus of the DDS accumulator divided by 2.

13. The apparatus of claim 7, wherein the DDS accumulator has a frequency control value FCW, and the means for performing an interpolation further comprises:

for a DDS accumulator state having a defined positive transition-state:

means for computing a difference in value between half the modulus of the DDS accumulator and the preceding DDS accumulator state to provide an accumulator differential value;

means for determining a quotient of the accumulator differential value and the frequency control value FCW to provide a clock shift ratio; and means for multiplying the clock shift ratio by k to provide a clock shift multiplier;

for a DDS accumulator state having a defined negative transition-state:

means for computing a difference in value between the modulus of the DDS accumulator and the preceding DDS accumulator state to provide an accumulator differential value;

means for determining a quotient of the accumulator differential value and the frequency control value FCW to provide a clock shift ratio; and means for multiplying the clock shift ratio by k to provide a clock shift multiplier.

14. The apparatus of claim 13, wherein the means for selecting an element of the set of phase-shifted clock signals comprises means for selecting the element of the set of phase-shifted clock signals identified by the clock shift multiplier to provide a selected phase-shift clock.

15. The apparatus of claim 14, wherein the means for repositioning the MSB further comprises:

for a DDS accumulator state having a defined positive transition-state:

means for repositioning the leading edge of the MSB to a point corresponding to the leading edge of the selected phase-shift clock; and for a DDS accumulator state having a defined negative transition-state:

means for repositioning the trailing edge of the MSB to a point corresponding to the leading edge of the selected phase-shift clock.

* * * * *